(12) United States Patent
Ikeda et al.

(10) Patent No.: US 8,632,866 B2
(45) Date of Patent: Jan. 21, 2014

(54) POLYESTER LAMINATES

(75) Inventors: Tsuyoshi Ikeda, Kanagawa (JP); Makoto Takahashi, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 680 days.

(21) Appl. No.: 11/224,132

(22) Filed: Sep. 13, 2005

(65) Prior Publication Data

US 2006/0057314 A1  Mar. 16, 2006

(30) Foreign Application Priority Data

Sep. 15, 2004 (JP) ................. 2004-268281

(51) Int. Cl.
*B29D 22/00* (2006.01)

(52) U.S. Cl.
USPC ....... 428/35.7; 428/34.1; 428/34.2; 428/34.6; 428/34.7

(58) Field of Classification Search
USPC ........ 428/220, 35.7, 480, 482, 209, 215, 156, 428/36.8, 474.4; 525/425, 220; 264/173.15; 220/62.15; 156/244.11
See application file for complete search history.

(56) References Cited

U.S. PATENT DOCUMENTS

| | | | | |
|---|---|---|---|---|
| 5,164,267 A * | 11/1992 | D'Heur et al. | ............. | 428/474.4 |
| 6,410,156 B1 * | 6/2002 | Akkapeddi et al. | ........ | 428/476.1 |
| 6,495,223 B1 * | 12/2002 | Berlin | ........... | 428/34.2 |
| 6,680,094 B2 * | 1/2004 | Kikuchi et al. | .............. | 428/36.6 |
| 6,740,376 B2 * | 5/2004 | Oguro et al. | ................. | 428/35.7 |
| 6,861,128 B1 * | 3/2005 | Muller et al. | ................. | 428/215 |
| 2002/0164465 A1 * | 11/2002 | Curro et al. | ................... | 428/198 |
| 2003/0195303 A1 * | 10/2003 | Ikeda et al. | ................... | 525/418 |

FOREIGN PATENT DOCUMENTS

| | | |
|---|---|---|
| EP | 1 164 155 | 12/2001 |
| EP | 1 262 524 | 12/2002 |
| JP | 2002-367675 A * | 12/2002 |
| JP | 2003-182014 | 7/2003 |

OTHER PUBLICATIONS

European Search Report, for Application No. EP 05 10 8343, dated Dec. 21, 2005.

* cited by examiner

*Primary Examiner* — Ellen S Raudenbush
(74) *Attorney, Agent, or Firm* — Antonelli, Terry, Stout & Kraus, LLP.

(57) ABSTRACT

A polyester laminate including at least one polyester layer C and at least one layer selected from the group consisting of a resin layer D and a paper layer E. The polyester layer C is made of a polyester resin A in which from 5 to 80 mol % of the total diol units is a diol unit having a cyclic acetal structure. The resin layer D is made of a resin other than the polyester resin A. At least one surface layer of the polyester laminate is the resin layer C. The polyester laminate is particularly suited as a container for preserving food because of its excellent heat sealability and high fragrance preservation.

27 Claims, No Drawings

POLYESTER LAMINATES

BACKGROUND OF THE INVENTION

1. Field of the Invention

The present invention relates to polyester laminates having a resin layer containing a polyester resin which is composed of diol units having a cyclic acetal structure and dicarboxylic acid units.

2. Description of the Prior Art

Laminates having a surface layer made of a heat-sealable resin have been widely used for the production of packaging materials and containers. Typical examples of such laminates include those made of polyolefin, particularly, polyethylene. Generally, polyethylene is poor in the gas barrier properties as well as in the preservation of fragrance of contents because it adsorbs fragrance of contents and allows low-boiling components to migrate. In addition, nutritive components of food such as vitamins are adsorbed by polyethylene. Therefore, polyethylene is not suitable in the application fields such as food packaging materials and containers which require gas barrier properties, fragrance preservation and non-adsorptivity of nutritive components.

In place of polyethylene, poly(ethylene terephthalate) excellent in the gas barrier properties and fragrance preservation has been examined for its potential as the material for laminates. However, poly(ethylene terephthalate) is poor in the heat sealability and is not suited for processing by extrusion lamination because of its low melt strength. To solve this drawback, the use of a copolymerized poly(ethylene terephthalate) or a polyester composition has been proposed (JP 7-196899A, JP 2002-225211A, JP 2003-311888A). However, the proposed copolyester is not sufficient in the melt strength although having a good heat sealability, to make a stable production of laminates difficult. In addition, since the glass transition temperature is low, the migration of low-boiling components occurs upon being brought into contact with hot products to be stored and the fragrance preservation is also poor.

SUMMARY OF THE INVENTION

The present invention is directed to providing polyester laminates which are excellent in the heat sealability and fragrance preservation and can be stably produced, thereby solving the above problems.

As a result of extensive study, it has been found that polyester laminates having a layer made of a particular polyester resin at least as the surface layer and a layer made of a material other than such a polyester resin is excellent in both the heat sealability and the fragrance preservation and can be produced in a stable manner. The particular polyester resin is characterized by a cyclic acetal structure contained in the diol unit in a specific amount. The present invention is based on this finding.

Thus, the present invention provides a polyester laminate which includes at lease one polyester layer C containing a polyester resin A in which from 5 to 80 mol % of total diol units is a diol unit having a cyclic acetal structure, and at least one layer selected from the group consisting of a resin layer D containing a resin other than the polyester resin A and a paper layer E, provided that at least one surface layer of the polyester laminate is the polyester layer C. The present invention further provides a container produced from such a polyester laminate.

The terms "dicarboxylic acid unit" and "diol unit" used herein with respect to polyester resins mean the units which form constitutional repeating units through ester linkage. Each dicarboxylic acid unit is expressed by a combination of the name of dicarboxylic acid to be generated by the hydrolysis of ester linkage which is followed by the word "unit," the same applying to the expression of diol unit.

DETAILED DESCRIPTION OF THE INVENTION

The present invention will be described in more detail below.

The polyester laminate of the present invention includes at lease one polyester layer C containing a polyester resin A and at least one layer selected from the group consisting of a resin layer D containing a resin other than the polyester resin A and a paper layer E. The polyester resin A is composed of dicarboxylic acid units and diol units in which from 5 to 80 mol % of total diol units is a diol unit having a cyclic acetal structure. At least one surface layer of the polyester laminate is the polyester layer C.

The diol unit having a cyclic acetal structure (hereinafter referred to as "cyclic acetal diol unit") is derived from a diol represented by the following formula 1:

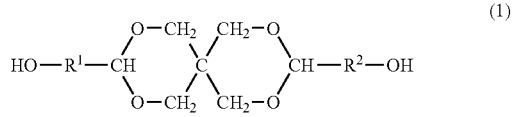

wherein each of $R^1$ and $R^2$ is independently an aliphatic hydrocarbylene group having from 1 to 10 carbon atoms, an alicyclic hydrocarbylene group having from 3 to 10 carbon atoms or an aromatic hydrocarbylene group having from 6 to 10 carbon atoms; and/or the following formula 2:

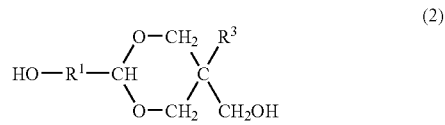

wherein $R^1$ is the same as defined above and $R^3$ is an aliphatic hydrocarbyl group having from 1 to 10 carbon atoms, an alicyclic hydrocarbyl group having from 3 to 10 carbon atoms or an aromatic hydrocarbyl group having from 6 to 10 carbon atoms.

Examples of $R^1$ and $R^2$ include methylene group, ethylene group, propylene group, isopropylene group, butylene group, structural isomers of butylene group such as isobutylene group, cyclohexylene group and phenylene group, with methylene group, ethylene group, propylene group, butylene group, isopropylene group and isobutylene group being preferred. Examples of $R^3$ include methyl group, ethyl group, propyl group, isopropyl group, butyl group, structural isomers of butyl group such as isobutyl group, cyclohexyl group and phenyl group, with methyl group, ethyl group, propyl group, butyl group, isopropyl group and isobutyl group being preferred. Preferred diols of the formula 1 or 2 are 3,9-bis(1,1-dimethyl-2-hydroxyethyl)-2,4,8,10-tetraoxaspiro[5.5]undecane and 5-methylol-5-ethyl-2-(1,1-dimethyl-2-hydroxyethyl)-1,3-dioxane.

Examples of diols for the diol units other than the cyclic acetal diol unit include, but not limited to, aliphatic diols such as ethylene glycol, trimethylene glycol, 1,4-butanediol, 1,5-pentanediol, 1,6-hexanediol, diethylene glycol, propylene glycol, and neopentyl glycol; alicyclic diols such as 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetralindimethanol, norbornanedimethanol, tricyclodecanedimethanol, and pentacyclododecanedimethanol; polyethers such as polyethylene glycol, polypropylene glycol, and polybutylene glycol; bis(hydroxyaryl)alkanes such as 2,2-bis(4-hydroxyphenyl) propane (bisphenol A), 2,2-bis(3,5-dibromo-4-hydroxyphenyl)propane (tetrabromobisphenol A), bis(4-hydroxyphenyl) methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-t-butyl-4-hydroxyphenyl)propane, 2,2-bis(3-bromo-4-hydroxyphenyl)propane, and 2,2-bis(3,5-dichloro-4-hydroxyphenyl)propane; alkyleneoxide adducts of the preceding bis (hydroxyaryl)alkanes; bis(hydroxyaryl)cycloalkanes such as 1,1-bis(4-hydroxyphenyl)cyclopentane, 1,1-bis(4-hydroxyphenyl)cyclohexane (bisphenol Z), 1,1-bis(3,5-dibromo-4-hydroxyphenyl)cyclohexane, and 1,1 - bis(3,5-dichloro-4-hydroxyphenyl)cyclohexane; bis(hydroxyaryl)arylalkanes such as 1,1-bis(4-hydroxyphenyl)-1-phenylethane and 1,1-bis(4-hydroxyphenyl)diphenylmethane; dihydroxydiaryl ethers such as 4,4'-dihydroxydiphenyl ether and 4,4'-hydroxy-3,3'-dimethyldiphenyl ether; dihydroxydiaryl sulfide such as 4,4'-dihydroxydiphenyl sulfide and 4,4'-dihydroxy-3, 3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; aromatic dihydroxy compounds such as hydroquinone, resorcinol, 4,4'-dihydroxybiphenyl, 4,4'-dihydroxydiphenyl ether, and 4,4'-dihydroxydiphenylbenzophenone; and alkyleneoxide adducts of the preceding aromatic dihydroxy compounds. In view of the mechanical strength and heat resistance of the polyester resin A and the easy availability of diol, preferred diol units are those derived from ethylene glycol, trimethylene glycol, 1,4-butanediol, and 1,4-cyclohexanedimethanol, with diol units derived from ethylene glycol being more preferred.

Examples of dicarboxylic acids for the dicarboxylic acid units of the polyester resin A include, but not limited to, aliphatic dicarboxylic acids such as succinic acid, glutaric acid, adipic acid, pimelic acid, suberic acid, azelaic acid, sebacic acid, decanedicarboxylic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, and 5-carboxy-5-ethyl-2-(1,1-dimethyl-2-carboxyethyl)-1,3-dioxane; and aromatic dicarboxylic acids such as terephthalic acid, isophthalic acid, phthalic acid, 2-methylterephthalic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid, and tetralindicarboxylic acid. In view of the mechanical strength and heat resistance of the polyester resin A and the easy availability of dicarboxylic acid, preferred dicarboxylic acid units are those derived from terephthalic acid, isophthalic acid and 2,6-naphthalenedicarboxylic acid.

The polyester resin A may include one or more kinds of other units in an amount not adversely affecting the effects of the present invention, which are derived from the compounds used to regulate its melt viscoelasticity and molecular weight. Examples of such units include those derived from monovalent alcohols such as butyl alcohol, hexyl alcohol and octyl alcohol; tri- or more valent alcohols such as trimethylolpropane, glycerol, 1,3,5-pentanetriol, and pentaerythritol; monocarboxylic acids such as benzoic acid, propionic acid and butyric acid; polycarboxylic acids such as trimellitic acid and pyromellitic acid; and hydroxycarboxylic acids such as glycolic acid, lactic acid, hydroxybutyric acid, 2-hydroxyisobutyric acid, and hydroxybenzoic acid.

To attain better moldability, heat resistance, mechanical properties, resistance to hydrolysis, etc., the polyester resin A is preferably composed of a cyclic acetal diol unit derived from 3,9-bis(1,1-dimethyl-2-hydroxyethyl)-2,4,8,10-tetraoxaspiro[5.5]undecane; a diol unit other than the cyclic acetal diol unit derived from ethylene glycol; and a dicarboxylic acid unit derived from at least one dicarboxylic acid selected from the group consisting of terephthalic acid, isophthalic acid and 2,6-naphthalenedicarboxylic acid.

The content of the cyclic acetal diol units based on the total diol units in the polyester resin A is from 5 to 80 mol %, preferably from 10 to 70 mol %, and more preferably from 15 to 60 mol %. The glass transition temperature of the polyester resin A becomes higher as the content increases within the above range, to enhance the heat resistance and fragrance preservation and improve the melt strength. By regulating the content within the above range, the heat sealability can be improved because the crystallizability is lowered.

The degree of heat resistance of the polyester resin A is controlled according to the end use. The glass transition temperature of the polyester resin A is preferably from 85 to 150° C., more preferably from 90 to 150° C., and still more preferably from 95 to 140° C. Within the above range, the polyester laminate acquires a good fragrance preservation and a heat seal temperature of a suitable range. The glass transition temperature varies depending on the kinds and contents of constitutional units of the polyester resin A. To regulate the glass transition temperature within the above range, the polyester resin A is preferably composed of a cyclic acetal diol unit derived from 3,9-bis(1,1-dimethyl-2-hydroxyethyl)-2,4, 8,10-tetraoxaspiro[5.5]undecane; a diol unit other than the cyclic acetal diol unit derived from ethylene glycol; and a dicarboxylic acid unit derived from terephthalic acid and/or 2,6-naphthalenedicarboxylic acid.

The intrinsic viscosity of the polyester resin A is selected according to the end use, and is preferably from 0.5 to 1.5 dL/g, more preferably from 0.5 to 1.2 dL/g, and still more preferably from 0.6 to 1.0 dL/g, when measured at 25° C. on a solution in a phenol/1,1,2,2-tetrachloroethane (6/4 by mass) mixed solvent. Within the above range, the polyester resin A is well balanced in the moldability and the mechanical properties.

The melt viscosity of the polyester resin A is selected according to the end use, and is preferably from 300 to 7,000 Pa·s and more preferably from 500 to 5000 Pa·s, when measured at 240° C. under a shear rate of 100 s$^{-1}$. Within the above range, the polyester resin A is well balanced in the moldability and the mechanical properties. The melt viscosity depends on the intrinsic viscosity and the kinds and contents of the constitutional units. For example, the melt viscosity increases with increasing content of the cyclic acetal diol unit.

The melt strength of the polyester resin A is selected according to the end use, and is preferably from 0.8 to 20 cN and more preferably from 1 to 10 cN, when measured under the conditions of a shear rate of 100 s$^{-1}$ and a melt viscosity of 1400 Pa·s. Within the above range, the polyester laminate is stably produced because the neck-in little occurs in the extrusion lamination.

The polyester resin A is produced by any of processes of producing known polyester without specific limitation, for example, by a melt polymerization such as interesterification and direct esterification or a solution polymerization. Any of known interesterification catalysts, esterification catalysts, etherification inhibitors, stabilizers such as heat stabilizers and light stabilizers, polymerization regulators, etc. may be used in the production of the polyester resin A. These may be selected according to the intended reaction rate, the intended color, safety, heat stability and weatherability of the polyester resin A, their elution tendency and hygienic safety, etc.

The polyester layer C is made of either the polyester resin A only or a composition containing the polyester resin A. The content of the polyester resin A in the composition depends on the content of the cyclic acetal diol unit in the polyester resin A and the properties to be desired, and is preferably 10% by weight or more, more preferably 20% by weight or more, and still more preferably 30% by weight or more. Within the above range, the resultant polyester laminate acquires a desired heat sealability, fragrance preservation and nonadsorptivity.

Examples of the components of the polyester layer C other than the polyester resin A include, but not limited to, polyester resins B which are composed of units derived from at least one dicarboxylic acid selected from the group consisting of terephthalic acid, isophthalic acid and 2,6-naphthalenedicarboxylic acid, and units derived from at least one diol selected from the group consisting of ethylene glycol, trimethylene glycol, 1,2-propylene glycol, 1,4-butanediol, 1,4-cyclohexanedimethanol, and bisphenol A. Specific examples of the polyester resins B include poly(ethylene terephthalate), poly(butylene terephthalate), terephthalic acid-1,4-cyclohexanedimethanol-ethylene glycol copolymer, isophthalic acid-terephthalic acid-ethylene glycol copolymer, poly(propylene terephthalate), poly(trimethylene terephthalate), poly(ethylene naphthalate), terephthalic acid-2,6-naphthalenedicarboxylic acid-ethylene glycol-1,4-cyclohexanedimethanol copolymer, and polyarylate. By the use of the polyester resin B, the heat resistance, moldability, impact resistance, etc. of the polyester layer C can be controlled. The polyester resin B is preferably poly(ethylene terephthalate) because of its good compatibility with the polyester resin A and mechanical properties, easy availability, and low costs. The content of the polyester resin B in the polyester layer C, if used, is preferably from 1 to 90% by weight, more preferably from 1 to 80% by weight, and still more preferably from 1 to 70% by weight.

The polyester layer C may also contain an oxygen barrier resin having an oxygen permeability lower than that of poly(ethylene terephthalate). By the use of the oxygen barrier resin, the resultant polyester laminate exhibits high oxygen barrier properties sufficient for food packaging materials, etc. Any of known oxygen barrier resins are usable in the present invention, and examples thereof include, but not limited to, polyacrylonitrile, acrylonitrile-styrene copolymer, butadiene-grafted acrylonitrile-acrylate copolymer, poly(vinyl alcohol), vinyl alcohol-ethylene copolymer, cellophane, polytrifluorochloroethylene, poly(vinyl fluoride), nylon 6, nylon 66, xylylene unit-containing polyamide resin, vinyl chloride-vinylidene chloride copolymer, poly(vinylidene chloride), vinylidene chloride-acrylonitrile copolymer, poly(glycolic acid), poly(ethylene naphthalate), ethylene terephthalate-ethylene naphthalate copolymer, poly(ethylene isophthalate), and ethylene terephthalate-ethylene isophthalate copolymer. Preferred are xylylene unit-containing polyamide resins, for example, homopolymers such as poly(m-xylylene adipamide), poly(m-xylylene sebacamide), poly(m-xylylene suberamide), poly(p-xylylene pimelamide), and poly(m-xylylene azelamide); copolymers such as m-xylylene-p-xylylene-adipic acid copolymer, m-xylylene-p-xylylene-pimelic acid copolymer, m-xylylene-p-xylylene-sebacic acid copolymer, and m-xylylene-p-xylylene-azelaic acid copolymer; and copolymers composed of the units contained in the homopolymers and copolymers cited above and other additional units derived from, for example, an aliphatic diamine such as hexamethylenediamine, an alicyclic diamine such as piperazine, an aromatic diamine such as p-bis(2-aminoethyl)benzene, an aromatic dicarboxylic acid such as terephthalic acid, a lactam such as ε-caprolactam, ω-aminocarboxylic acid such as 7-aminoheptane, and an aromatic aminocarboxylic acid such as p-aminomethylbenzoic acid. More preferred are polyamides composed of a diamine unit mainly derived from m-xylylenediamine and/or p-xylylenediamine and a dicarboxylic acid unit mainly derived from aliphatic dicarboxylic acid and/or aromatic dicarboxylic acid. Still more preferred are xylylene unit-containing polyamide resins composed of a diamine unit containing 70 mol % or more of m-xylylenediamine units and a dicarboxylic acid unit containing 70 mol % or more of adipic acid units, because these polyamide resins are excellent in the oxygen barrier properties, moldability and compatibility with the polyester resin A. The gas barrier properties of the polyester laminate can be further improved by incorporating a clay mineral such as montmorillonite or an organic transition-metal compound such as cobalt stearate into the oxygen barrier resin. The content of the oxygen barrier resin in the polyester layer C, if used, is preferably from 1 to 90% by weight, more preferably from 1 to 60% by weight, and still more preferably from 1 to 40% by weight.

The polyester layer C may further contain additives or molding aids such as an antioxidant, a light stabilizer, an ultraviolet absorber, a plasticizer, a thickening agent, a matting agent, a desiccation modifier, an antistatic agent, an antisetting agent, a surfactant, a flow control agent, a drying oil, a wax, a colorant, a reinforcing material, a surface smoother, a leveling agent, a curing promoter, and a tackifier; resins and their oligomers such as polyolefin resin, polycarbonate resin, vinyl chloride resin, vinyl acetate resin, poly(acrylic acid) resin, poly(methacrylic acid) resin, polystyrene resin, ABS resin, polyimide resin, AS resin; organic fillers such as wood flour, bamboo flour, coconut shell flour, cork flour, pulp flour, crosslinked polyester, polystyrene, styrene-acrylic resin, urea resin, carbon fiber, synthetic fiber, and natural fiber; and inorganic fillers such as calcium carbonate, talc, kaolin clay, mica, nepheline syenite, synthetic silicic acid, ground quartz, ground silica, diatomaceous earth, barium sulfate, ground pumice, shirasu-balloon, glass balloon, fly ash balloon, glass fiber, sepiolite, mineral fiber, and whisker.

The polyester laminate includes, in addition to the polyester layer C, at least one layer selected from the group consisting of a resin layer D and a paper layer E. The polyester laminate may include two or more resin layers D and/or paper layers E. The materials of the resin layer D may include, but not limited to, a resin other than the polyester resin A such as the polyester resin B, the oxygen barrier resin, recovered polyester, polyolefin, polycarbonate, vinyl chloride resin, vinyl acetate resin, poly(acrylic acid), poly(methacrylic resin), polystyrene, ABS resin, polyimide, and AS resin. The materials for the paper layer E include, for example, craft paper, roll paper, art paper, carton paper, glassine paper, clupak paper, paperboard, and corrugated board. These materials are selected according to the desired function, end used and properties of the polyester laminate, and may be used alone or in combination of two or more. If the polyester laminate is used as food packaging materials, the resin layer D is preferably made of the oxygen barrier resin and more preferably a xylylene unit-containing polyamide resin composed of a diamine unit including 70 mol % or more of m-xylylenediamine units and a dicarboxylic acid unit including 70 mol % or more of adipic acid units.

The polyester laminate of the present invention may further optionally include an inorganic layer F which is made of at least one material selected from metals such as iron, aluminum and zinc; metal oxides such as silicon oxides and aluminum oxides; and carbon.

The polyester layer C, at least one layer selected from the resin layer D and the paper layer E, and the optional inorganic layer F are laminated, if needed, through an adhesive layer G made of an ethylene-acrylic acid copolymer, an ion crosslinked olefin copolymer, a maleic anhydride-grafted polyethylene, a copolyester, etc.

Although the layered structure of the polyester laminate varies depending on its end use, at least one surface layer is required to be the polyester layer C. With such a layered structure, the polyester laminate exhibits a good heat sealability, fragrance preservation and nonadsorptivity to effective ingredients of food. The number of each of the layers C, D, E, F and G may be two or more.

Examples of the layered structure include C/D, C/D/C, C/D/D, C/D/D, C/D/D/C, C/D/D/D, C/G/D/D, C/G/D/D/C, C/G/D/D/D, C/G/D/D/D/C, C/G/D/D/D/D, C/G/D/D/D/G/ C, C/G/D/D/D/G/D, C/F/D, C/F/D/C, C/F/D/D, C/F/D/F/C, C/F/D/F/D, C/F/G/D, C/F/G/D/C, C/F/G/D/D, C/G/F/D, C/G/F/D/C, C/G/F/D/D, C/G/F/G/D, C/G/F/G/D/C, C/G/F/ G/D/D, C/D/E, C/D/E/C, C/D/E/D, C/G/D/E, C/G/D/E/C, C/G/D/E/D, C/G/D/E/D/C, C/G/D/E/D/D, C/G/D/E/D/G/C, C/G/D/E/D/G/D, C/F/E, C/F/E/C, C/F/E/D, C/F/E/F/C, C/F/ E/F/D, C/F/G/E, C/F/G/E/C, C/F/G/E/D, C/G/F/E, C/G/F/E/ C, C/G/F/E/D, C/G/F/G/E, C/G/F/G/E/C, and C/G/F/G/E/D. In case two or more polyester layers D are included in the polyester laminate, these layers may be the same or different. The same applies to each of the layers D, E, F and G when two or more layers are included.

The basis weight of the paper material for the paper layer E is preferably from 10 to 500 g/m$^2$ because of its wide applicability. The paper material may contain, if needed, a loading material such as clay, talc, calcium carbonate and fine powder of urea resin; a sizing agent such as rosin, alkylketene dimer, higher fatty acid, epoxidized fatty amide, paraffin wax and alkenylsuccinic acid; a strength agent such as starch, polyamide polyamine epichlorohydrin and polyacrylamide; or a binder such as aluminum sulfate and cationic polymer.

The polyester laminate may be produced by any of known methods such as a extrusion lamination, a dry lamination and a wet lamination, with the extrusion lamination being preferred because of its good productivity. Since the melt strength of the polyester resin A is high, the polyester laminate can be produced stably even by the extrusion lamination. The lamination may be performed by any of known lamination methods such as a coextrusion, a coextrusion lamination, an extrusion lamination and a dry lamination. As mentioned above, the lamination may be effected by the use of an adhesive or an adhesive resin.

The extrusion lamination, for example, is carried out as follows. A molten polyester resin A is extruded onto a paper, a resin film or a metal film, each preferably being improved in its adhesivity by a flame treatment, a corona discharge treatment, etc. Then, the lamination is completed by a roll press. The extrusion temperature is preferably from 260 to 320° C. Within the above range, the polyester laminate is produced stably because the polyester layer C adheres to another layer firmly and the neck-in little occurs. Using a multi-layer extruder, a polyester laminate including an oxygen barrier layer (resin layer D) and/or an adhesive layer G can be easily produced. For example, a polyester resin A, an adhesive and an oxygen barrier resin each being molten in different extruders are made into a molten stack through a feed block, which molten stack is extruded onto a paper, a resin film or a metal film in the same manner as described above, and then pressed with a roll, to produce a multi-layer laminate.

The thickness of the polyester layer C is controlled by changing the extrusion conditions, and is preferably from 5 to 300 μm. Within the above range, the adhesion of the polyester layer C to the resin layer D, the paper layer E or the inorganic layer F is enhanced, and the heat sealability and the balance in mechanical strength, etc. are good.

The thicknesses of the other layers are preferably from 5 to 300 μm for the resin layer D, from 30 to 1000 μm for the paper layer E, from 0.01 to 200 μm for the inorganic layer F, and from 0.1 to 50 μm for the adhesive layer G. The total thickness of the polyester laminate is preferably from 10 to 2000 μm.

The polyester laminate has a good heat sealability and exhibits a heat seal strength of 0.8 kgf/15 mm or more when heat-sealed under known conditions.

The polyester laminate may be formed into various shaped articles, for example, a flat article such as sheet, card and film and a container such as carton, cup, box and pouch by known forming methods such as punching, cutting, bending and heat sealing, according to the end use. The polyester laminate shows a good punching ability to hardly form whiskers of resin.

A container made of the polyester laminate with its polyester layer C facing the inside of the container is particularly preferred because of easiness of heat sealing. Also, since the products to be stored are brought into contact with the polyester layer C, the fragrance preservation and the nonadsorptivity to effective ingredient of foods are enhanced.

The products to be stored in the containers made of the polyester laminate may include, but not limited to, foods, cosmetics, medicines, toiletries, machine parts, electric or electronic parts, oils and resins. To fully utilize the heat sealability, the fragrance preservation and the nonadsorptivity, the polyester laminate is preferably formed into containers for storing foods. Since the glass transition temperature of the polyester resin A is high, the polyester laminate itself and the containers made thereof withstand the sterilization treatment by hot aqueous hydrogen peroxide, to hardly cause the reduction of heat sealability and the embrittlement due to crystallization.

The foods to be stored are preferably those subjected to heating during its production, for example, during extraction, sterilization, melting, cooking, etc., although not limited thereto. Examples thereof include beverages such as vegetable juice, fruit juice, tea, coffee, coffee-flavored drink, milk, dairy drink, mineral water, ionic drink, liquor, lactobacillic drink, and soybean milk; gel-like foods such as soybean curd (tofu), egg-tasted curd, jelly, pudding, sweat bean-agar jelly, mousse, yogurt, and almond jelly; seasonings such as Worcestershire sauce, soy sauce (shoyu), ketchup, dipping sauce for noodles, barbecue sauce, teriyaki sauce, cooking vinegar, sweet Japanese cooking wine (mirin), dressing, jam, mayonnaise, fermented soybean paste (miso), marinade, and grated spice; processed meat products such as salami, ham, sausage, bite-size chicken on bamboo skewers (yakitori), meat ball, hamburger, roast pork, and beef jerky; processed marine products such as steamed fish paste, boiled shell fish, simmered fish, and grilled fish paste; processed rice products such as gruel, cooked rice, paella, and saffron rice; sauces such as meat sauce, hot Chinese cooking sauce, pasta sauce, curry, stew, and hash sauce; dairy products such as cheese, butter, cream, and condensed milk; processed egg products such as boiled egg and soft boiled egg; daily dishes such as simmered vegetable, simmered bean, deep-fried dish, steamed dish, pan-fried dish, simmered dish, and broiled dish; pickles; noodles and pastas such as Japanese wheat noodle, Japanese buckwheat noodle and spaghetti; and syruped fruits.

The polyester laminate withstands the heating for cooking, warming over, sterilization, keeping warm, etc. by electronic oven, hot water, hot air, steam, ultraviolet ray, boiling, retort, hot vending machine, etc. The container can preferably keep its properties under heating at 55 to 140° C. for 0.001 to 100 min.

The present invention will be explained in more detail by reference to the following example which should not be construed to limit the scope of the present invention.

Polyester resins, laminates with backing paper, laminates with backing resin film were evaluated by the following methods.

(I) fEvaluation of Polyester Resins
(Ia) Content o Cyclic Acetal Diol Units

Calculated from the results of $^1$H-NMR measurement at 400 MHz on a sample solution in heavy chloroform using JNM-AL400 available from JEOL, Ltd.

(Ib) Glass Transition Temperature

A sample polyester resin (about 10 mg) was placed into a non-sealed aluminum container, and then heated in nitrogen stream (30 mL/min) at a temperature rising rate of 20° C./min to obtain a DSC curve using DSC/TA-50WS available from Shimadzu Corporation. The central temperature in the steep rising region of the DSC curve was employed as the glass transition temperature.

(Ic) Intrinsic Viscosity

Into 120 g of a phenol/1,1,2,2-tetrachloroethane (6/4 by mass) mixed solvent, 0.5 g of polyester resin was dissolved under heating. The solution was filtered and the filtrate was cooled to 25° C. to prepare a test sample, which was measured for the intrinsic viscosity at 25° C. using an automatic capillary viscometer SS-300-L1 available from Shibayama Scientific Co., Ltd.

(Id) Melt Viscosity

Measured using Capirograph 1C (trade name) available form Toyo Seiki Seisaku-Sho, Ltd. under the following conditions: 1 mm capillary diameter, 10 mm capillary length, 240° C. measuring temperature, 3 min preheating time, and 100 sec$^{-1}$ shear rate.

(Ie) Melt Strength

A polyester resin was extruded at a cross-head speed of 10 mm/min at a temperature at which the melt viscosity was 1400 Pa·s under a shear rate of 100 sec$^{-1}$, and the load for taking up the extruded strand at a speed of 40 m/min was measured using Capirograph 1C (trade name) available form Toyo Seiki Seisaku-Sho, Ltd. equipped with a capillary having 1 mm diameter and 10 mm length. The melt strength was expressed by the measured load.

(II) Evaluation of Laminate with Backing Paper
(IIa) Moldability

A test laminate with a backing paper was measured for its thickness at seven positions in the transverse direction at 50-mm intervals and seven positions in the machine direction at 100-mm intervals (total 49 positions). From the measured values, the average and the standard deviation of the thickness of resin layer were calculated. The moldability was evaluated by the quotient of the standard deviation divided by the average. The smaller the quotient, the better the moldability.

(IIb) Heat Seal Strength

A test laminate was heat-sealed by heating at 160 to 220° C. for 5 s under a pressure of 2 kgf/cm$^2$ using a heat gradient tester, HG-100 available form Toyo Seiki Seisaku-Sho, Ltd. The heat-sealed laminate was tested for the heat seal strength by a T-peel test under a chuck interval of 50 mm, a pulling rate of 300 mm/min and a heat seal width of 15 mm using a tensile strength tester, Strograph V1-C available form Toyo Seiki Seisaku-Sho, Ltd.

(IIc) Fragrance Preservation

A test laminate of 100 mm width was heat-sealed with its surface layer facing inside to form a tetrahedron container. A green tea of 90° C. was placed into the container and allowed to stand for 24 h at room temperature. Then, the green tea was tested for its fragrance organoleptically. The evaluation was made according to the following criteria.

A: no loss of green tea fragrance and no smell of resin.

B: no loss of green tea fragrance, but smell of resin.

C: loss of green tea fragrance and smell of resin.

(IId) Adsorptivity

In a container prepared in the same manner as in IIc, orange juice was stored for seven days at room temperature. Then, the content of limonene in the orange juice was gas-chromatically determined. In the same manner, a lactobacillic drink was stored for seven days at room temperature. Then, the content of remaining vitamin D in the lactobacillic drink was gas-chromatically determined. A large content means a low adsorptivity of the container.

(III) Evaluation of Laminate with Backing Resin Film
(IIIa) Heat Seal Strength

A test laminate was heat-sealed by heating at 160 to 200° C. for 2 s under a pressure of 2 kgf/cm$^2$ using a heat gradient tester, HG-100 available form Toyo Seiki Seisaku-Sho, Ltd. The heat-sealed laminate was tested for the heat seal strength by a T-peel test under a chuck interval of 50 mm, a pulling rate of 300 mm/min and a heat seal width of 15 mm using a tensile strength tester, Strograph V1-C available form Toyo Seiki Seisaku-Sho, Ltd.

PRODUCTION EXAMPLES 1-2

Production of Polyester Resins A1 and A2

Into a 150-L reactor equipped with a fractionating packed column, a partial condenser, a total condenser, a cold trap, a stirrer, a heater, and a nitrogen inlet, the starting monomers shown in Table 1 were charged. The interesterification was performed in the presence of manganese acetate tetrahydrate in an amount of 0.03 mol % of the dicarboxylic acid component by raising the temperature to 215° C. under a nitrogen atmosphere. After the conversion of the dicarboxylic acid component reached 90% or higher, 0.02 mol % of antimony (III) oxide and 0.06 mol % of trimethyl phosphate, each based on the dicarboxylic acid component, were added. Then the temperature was gradually raised and the pressure was gradually reduced, to allow the polycondensation to proceed at 270° C. under 0.1 kPa or lower. The reaction was stopped at the time when the melt viscosity reached a predetermined level, to produce each of the polyester resins A1 and A2. The evaluation results are shown in Table 1.

TABLE 1

|  | Production Examples | |
| --- | --- | --- |
|  | 1 | 2 |
| Monomers charged (mol) | | |
| dicarboxylic acid component | | |
| DMT | 201.8 | 174.6 |
| diol component | | |
| SPG | 62.6 | 80.3 |
| EG | 341.1 | 356.2 |
| Polyester resin | A1 | A2 |
| Content of cyclic acetal diol (mol %) | 31 | 46 |
| Glass transition temperature (° C.) | 104 | 113 |
| Intrinsic viscosity (dL/g) | 0.70 | 0.66 |
| Melt viscosity (Pa · s) | 2150 | 2950 |
| Melt strength (cN) | 2.1 | 2.9 |

DMT: dimethyl terephthalate
SPG: 3,9-bis(1,1-dimethyl-2-hydroxyethyl)-2,4,8,10-tetraoxaspiro[5.5]undecane
EG: ethylene glycol

EXAMPLE 1

The polyester resin A1 is melted in a 40-mm extruder at a cylinder temperature of 250 to 290° C. and extruded at a T-die temperature of 300° C. onto a base paper (MCP270 available from Tokyo Paper Mfg. Co., Ltd., 400 mm width, 270 g/m$^2$ basis weight, 300 μm thickness) which had been corona-treated (150 W/m$^2$/min) using a corona discharger available from Tomoe Kogyo Co., Ltd. Then, the extrusion lamination was conducted at a rate of 8 m/min by pressing with a roll of 70° C., to produce a polyester laminate backed with a paper layer. Evaluation results are shown in Table 2.

EXAMPLE 2

In the same manner as in Example 1 except for using the polyester resin A2 in place of the polyester resin A1, a polyester laminate backed with a paper layer was produced. Evaluation results are shown in Table 2.

EXAMPLE 3

In the same manner as in Example 1 except for using a composition consisting of 67 parts by weight of polyester resin A2 and 33 parts by weight of polyethylene terephthalate (RT-543C available from Japan Unipet Co., Ltd.) in place of the polyester resin A1, a polyester laminate backed with a paper layer was produced. Evaluation results are shown in Table 2.

EXAMPLE 4

The polyester resin A1 for the layer a, an adhesive resin for the layer b (Modic P534 available from Mitsubishi Chemical Corporation), and a resin composition for the layer c consisting of 80 parts by weight of a polyamide resin 1 (MX Nylon 6011 available from Mitsubishi Gas Chemical Company, Inc.) and 20 parts by weight of a polyamide resin 2 (Nylon 6 5015 available from Ube Industries, Ltd.) were melted respectively in a 40-mm extruder at a cylinder temperature of 230 to 240° C., a 30-mm extruder at a cylinder temperature of 230 to 240° C., and a 40-mm extruder at a cylinder temperature of 250 to 270° C. The molten resins were made into a molten multi-layer stack (layer a/layer b/layer c) through a feed block at 280 to 290° C. The molten multi-layer stack was then extruded onto a base paper (MCP270) which had been corona-treated (150 W/m$^2$/min) using a corona discharger available from Tomoe Kogyo Co., Ltd., to obtain a stack of layer a/layer b/layer c/paper layer. The extrusion lamination was conducted at a rate of 8 m/min by pressing with a roll of 70° C., to produce a polyester laminate backed with a paper layer. Evaluation results are shown in Table 2.

TABLE 2

|  | Examples | | | |
| --- | --- | --- | --- | --- |
|  | 1 | 2 | 3 | 4 |
| Laminate Structure | A1/P | A2/P | (A2 + PET)/P | A1/AD/(PA1 + PA2)/P |
| Moldability (thickness of resin layer) | | | | |
| average (μm) | 52.0 | 62.8 | 55.4 | 93.3 |
| standard deviation (μm) | 5.0 | 5.8 | 7.1 | 7.4 |
| standard deviation/average | 0.095 | 0.092 | 0.128 | 0.080 |
| Heat seal strength (kgf/15 mm) | | | | |
| heat-sealed at 160° C. | 1.40 | 1.43 | 1.55 | — |
| heat-sealed at 180° C. | 1.29 | 1.45 | 1.36 | 1.08 |
| heat-sealed at 200° C. | 1.30 | 1.35 | 1.41 | 2.24 |
| heat-sealed at 220° C. | — | 1.35 | — | 2.80 |
| Fragrance preservation | A | A | A | A |
| Adsorptivity | | | | |
| limonene (ppm) | 8.9 | 8.8 | 8.7 | 9.0 |
| vitamin D (ppb) | 2.9 | 2.9 | 2.9 | 2.8 |

A1: polyester resin A1
A2: polyester resin A2
PET: polyethylene terephthalate (RT-543C available from Japan Unipet Co., Ltd.)
AD: adhesive resin (Modic P534 available from Mitsubishi Chemical Corporation)
PA1: polyamide resin 1 (MX Nylon 6011 available from Mitsubishi Gas Chemical Company, Inc.)
PA2: polyamide resin 2 (Nylon 6 5015 available from Ube Industries, Ltd.)
P: base paper (MCP270 available from Tokyo Paper MFG. Co., Ltd.)

COMPARATIVE EXAMPLES 1-2

In the same manner as in Example 1 except for using polyethylene terephthalate (RT-543C available from Japan Unipet Co., Ltd.) or a copolyester resin (Selar PT8307 available from Du Pont-Mitsui Polychemicals Co., Ltd.) in place of the polyester resin A1, each laminate backed with a paper layer was produced. Evaluation results are shown in Table 3.

COMPARATIVE EXAMPLE 3

A commercially available polyethylene laminate backed with a paper layer (Cupforma Classic PE (280+15) available from Stora Enso Packaging Boards Co., Ltd.) was evaluated for its properties. The results are shown in Table 3.

TABLE 3

| | Comparative Examples | | |
|---|---|---|---|
| | 1 | 2 | 3 |
| Laminate Structure | PET/P | PT/P | PE |
| Moldability (thickness of resin layer) | | | |
| average (μm) | 77.4 | 80.0 | 15.0 |
| standard deviation (μm) | 5.8 | 20.6 | 1.1 |
| standard deviation/average | 0.092 | 0.258 | 0.073 |
| Heat seal strength (kgf/15 mm) | | | |
| heat-sealed at 160° C. | 0.22 | 1.90 | 0.88 |
| heat-sealed at 180° C. | 0.36 | 1.55 | 0.76 |
| heat-sealed at 200° C. | 0.33 | 1.35 | — |
| Fragrance preservation | B | B | C |
| Adsorptivity | | | |
| limonene (ppm) | 8.8 | 8.8 | 2.5 |
| vitamin D (ppb) | 2.9 | 2.9 | 2.6 |

PET: polyethylene terephthalate (RT-543C available from Japan Unipet Co., Ltd.)
PT: copolyester resin (Selar PT8307 available from Du Pont-Mitsui Polychemicals Co., Ltd.)
PE: polyethylene film backed with paper (Cupforma Classic PE (280 + 15) available from Stora Enso Packaging Boards Co., Ltd.)
P: base paper (MCP270 available from Tokyo Paper MFG. Co., Ltd.)

EXAMPLES 5-6

Each non-stretched polyester film of 100 μm thick was produced by extruding the polyester resin A1 or the polyester resin A2 from a 30-mm extruder at a cylinder temperature of 230 to 250° C. and a T-die temperature of 250° C.

An adhesive (TM-329 available from Toyo Morton Co., Ltd.) was applied onto a base polyester film (E5100 available from Toyobo Co., Ltd.) and the solvent was evaporated by heating at 85° C. for 10 s. Each non-stretched polyester film prepared above was overlaid on the applied adhesive and laminated using a laminator (available from MCK Co., Ltd.), to produce each polyester laminate backed with a resin film. After heating at 40° C. for seven days, the polyester laminate was evaluated for its heat sealability.

TABLE 4

| | Examples | |
|---|---|---|
| Heat seal strength (kgf/15 mm) | 5 | 6 |
| heat-sealed at 160° C. | 0.84 | — |
| heat-sealed at 180° C. | 3.57 | — |
| heat-sealed at 200° C. | 4.65 | 0.99 |

The polyester laminates of the present invention are excellent in the heat sealability and the fragrance preservation, and suited for the production of food packaging materials and containers. Thus, the present invention is of great industrial value.

What is claimed is:
1. A polyester laminate which consists of:
   (a) one polyester layer C, in the form of a film, consisting of either (1) a polyester resin A wherein from 5 to 80 mol % of total diol units is a diol unit having a cyclic acetal structure, or (2) a combination of the polyester resin A and a polyester resin B which is a polyester resin other than the polyester resin A,
   (b) a paper layer E, and
   (c) another polyester layer C, in the form of a film, wherein said another polyester layer C consists of either (1') a polyester resin A' wherein from 5 to 80 mol % of total diol units is a diol unit having a cyclic acetal structure, or (2') a combination of the polyester resin A' and a polyester resin B' which is a polyester resin other than the polyester resin A',
   wherein said one polyester layer C and said another polyester layer C sandwich said paper layer E, and
   wherein each of the polyester resins B and B' is at least one compound selected from the group consisting of poly(ethylene terephthalate), poly(butylene terephthalate), terephthalic acid-1,4-cyclohexanedimethanol-ethylene glycol copolymer, isophthalic acid-terephthalic acid-ethylene glycol copolymer, poly(propylene terephthalate), poly(trimethylene terephthalate), poly(ethylene naphthalate), terephthalic acid-2,6-naphthalenedicarboxylic acid-ethylene glycol-1,4-cyclohexanedimethanol copolymer, and polyarylate.

2. The polyester laminate according to claim 1, wherein the diol unit having a cyclic acetal structure is derived from a diol represented by the following formula 1:

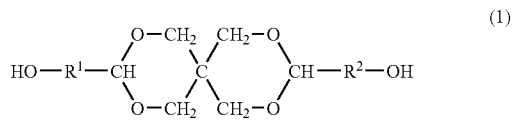

(1)

wherein each of $R^1$ and $R^2$ is independently an aliphatic hydrocarbylene group having from 1 to 10 carbon atoms, an alicyclic hydrocarbylene group having from 3 to 10 carbon atoms or an aromatic hydrocarbylene group having from 6 to 10 carbon atoms; or the following formula 2:

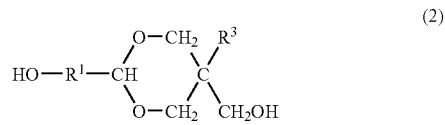

(2)

wherein $R^1$ is the same as defined above and $R^3$ is an aliphatic hydrocarbyl group having from 1 to 10 carbon atoms, an alicyclic hydrocarbyl group having from 3 to 10 carbon atoms or an aromatic hydrocarbyl group having from 6 to 10 carbon atoms.

3. The polyester laminate according to claim 2, wherein the diol of the formula 1 is 3,9-bis(1,1-dimethyl-2-hydroxyethyl)-2,4,8,10-tetraoxaspiro[5.5]undecane, and the diol of the formula 2 is 5-methylol-5-ethyl-2-(1,1-dimethyl-2-hydroxyethyl)-1,3-dioxane.

4. The polyester laminate according to claim 1, wherein a glass transition temperature of the polyester resin A is from 85 to 150° C.

5. The polyester laminate according to claim 1, wherein a melt strength of the polyester resin A is from 0.8 to 20 cN when measured at a shear rate of 100 s$^{-1}$ and a melt viscosity of 1400 Pa·s.

6. The polyester laminate according to claim 1, wherein the polyester resin B is poly(ethylene terephthalate).

7. The polyester laminate according to claim 1, which is produced by an extrusion lamination.

8. The polyester laminate according to claim 1, which is formed into a container.

9. The polyester laminate according to claim 8, wherein an inner surface of the container is the one polyester layer C.

10. The polyester laminate according to claim 8, wherein the container is for use in preserving food.

11. The polyester laminate according to claim 1, having the property that it can be sealed by heat.

12. The polyester laminate according to claim 1, wherein 10 to 70 mol % of the total diol units is the diol unit having the cyclic structure.

13. The polyester laminate according to claim 1, wherein an intrinsic viscosity of the polyester resin A is 0.5 to 1.5 dL/g, when measured at 25° C. on a solution in a phenol/1,1,2,2-tetrachloroethane (6/4 by mass) mixed solvent.

14. The polyester laminate according to claim 1, wherein a melt viscosity of the polyester resin A is from 300 to 7,000 Pa·s when measured at 240° C. under a shear rate of 100 s$^{-1}$.

15. The polyester laminate according to claim 1, wherein the one polyester layer C comprises at least 10% by weight of the polyester resin A.

16. The polyester laminate according to claim 1, wherein the one polyester layer C comprises at least 30% by weight of the polyester resin A.

17. The polyester laminate according to claim 1, wherein the polyester laminate has a property of fragrance preservation.

18. The polyester laminate according to claim 1, having properties of heat sealability and fragrance preservation.

19. The polyester laminate according to claim 1, wherein the polyester laminate consists of (a) said one polyester layer C, (b) said paper layer E, and (c) said another polyester layer C, said one polyester resin layer C and said another polyester layer C sandwiching said (b) paper layer E.

20. The polyester laminate according to claim 19, wherein said one polyester layer C and said another polyester layer C are made of a same polyester material.

21. The polyester laminate according to claim 1, wherein said one polyester layer C and said another polyester layer C are made of a same polyester material.

22. The polyester laminate according to claim 1, wherein a content of the polyester resin B in the polyester layer C is 1 to 90% by weight.

23. The polyester laminate according to claim 1, wherein a content of the polyester resin B in the polyester layer C is 1 to 70% by weight.

24. The polyester laminate according to claim 1, wherein paper material of the paper layer E has a basis weight of 10 to 500 g/m$^2$.

25. The polyester laminate according to claim 1, wherein paper material of the paper layer E includes at least one material selected from the group consisting of a loading material, a sizing agent, a strength agent and a binder.

26. The polyester laminate according to claim 1, wherein the paper layer E has a thickness of 30 to 1000 μm.

27. The polyester laminate according to claim 1, wherein material of the paper layer E is selected from the group consisting of craft paper, roll paper, art paper, carton paper, glassine paper, clupak paper, paperboard and corrugated board.

* * * * *